(12) United States Patent
He

(10) Patent No.: US 7,264,168 B2
(45) Date of Patent: Sep. 4, 2007

(54) ASYMMETRICAL SCANNER

(75) Inventor: Duanfeng He, S. Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 208 days.

(21) Appl. No.: 11/047,505

(22) Filed: Jan. 31, 2005

(65) Prior Publication Data

US 2006/0144949 A1 Jul. 6, 2006

Related U.S. Application Data

(63) Continuation-in-part of application No. 11/027,733, filed on Dec. 30, 2004.

(51) Int. Cl.
*G06K 7/10* (2006.01)
(52) U.S. Cl. .............................. 235/462.45; 235/472.01
(58) Field of Classification Search ........... 235/462.45, 235/472.01
See application file for complete search history.

(56) References Cited

U.S. PATENT DOCUMENTS

| 5,979,764 | A | 11/1999 | Swyst |
| 2001/0045464 | A1* | 11/2001 | Dvorkis et al. ........ 235/462.45 |

* cited by examiner

*Primary Examiner*—Karl D. Frech
(74) *Attorney, Agent, or Firm*—Fay Kaplun & Marcin, LLP

(57) ABSTRACT

Methods and apparatus for direct part mark scanning where a scanner operator is provided with a scanner comprising a slanted front end. The slanted front comprises a window for a scan module, such as, for example a camera, and an illumination module. The slanted front guides a user to tilt the scanner when scanning dataforms. Additionally, the internal scan module can be positioned to view a target dataform at an angle, even when the object being scanned is not tilted with regard to the scanner body.

20 Claims, 15 Drawing Sheets

1200

ASYMMETRICAL SCANNER

REFERENCE TO RELATED APPLICATIONS

This application is a continuation-in-part of U.S. patent application Ser. No. 11/027,733, entitled, "Methods and Apparatus for Information capture illumination", filed Dec. 30, 2004. The specification of the above-identified application is incorporated herewith by reference.

FIELD OF THE INVENTION

The invention is directed to Direct Part Mark (DPM) scanners and, more particularly to a slanted scanner head and a scanner component layout.

BACKGROUND OF THE INVENTION

There are numerous standards for encoding numeric and other information in visual form, such as the Universal Product Codes (UPC) and/or European Article Numbers (EAN). These numeric codes allow businesses to identify products and manufactures, maintain vast inventories, and manage a wide variety of objects under a similar system and many other functions. The UPC and/or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to identifying products. They can be used to identify important objects, places, etc.

Direct Part Marking (DPM) is an important way to permanently mark objects for identification. For example, the automotive and aerospace industries have decided to use DPM dataforms to identify their products. In DPM, the surface of the object is modified to include dataforms, such as, for example, barcodes, two dimensional codes, etc. One exemplary method of marking is dot-peening, in which the surface of the object is impacted by a peening device, such as, for example, a stylus. Each impact creates a "crater", and a collection of craters can be used to form patterns that represent dataforms such as a DataMatrix™. The crater may also have a slightly raised rim around its circumference created by the material displaced during the peening process. Other methods to create surface profile modifications comprise laser etching, chemical etching, and electrochemical etching.

FIG. 1 illustrates an exemplary dot-peened dataform 102. The circles represent craters on the surface of the object. The craters are arranged in an array that represents information. The dataform 102 can comprise information regarding the manufacturer, the UPC, the time, date and location of manufacture, etc. This information can be used for inventory, accountability, identification, recalls, etc.

In some DPM applications there is no intrinsic contrast at the site of the marking between the surface of the object and the dataform, when scanning DPM dataforms, scanning devices use the creation of highlights and/or shadows on the surface of the object to properly detect the dataform. Two ways to detect the dataform are to use bright field illumination and dark field illumination.

In an exemplary bright field illumination implementation, an extended light source is used to create a broad beam illumination. When an image of the dataform is captured using bright field illumination, the background surface tends to show up bright, while the marked features, i.e., the dataform, shows up dark. In one exemplary dark field illumination implementation, a narrow beam illumination is created by a set of point light sources rather than a single point light source. When using dark field illumination, the dataform is lit up brightly, while the surface of the object is left in relative darkness.

Known scanners that use this dark field illumination method implement point light sources that are symmetrical about the optical system of their camera. For example, one known scanner has a ring of 9 light emitting diodes (LEDs) that illuminate the dataform at the same time, while other scanners have a diffusing lightpipe that has a cylindrical extrusion that is designed to enclose the mark being scanned.

Other handheld scanners comprise two light sources that illuminate a dataform from the left and right sides simultaneously, while a proposed print-quality standard of DPM suggests the use of four point light sources 90° from each other and at 45° from the surface of the dataform, with the camera of the scanner situated at a perpendicular direction that passes through the center, or in other words, along an axis that is symmetrical with respect to the four light sources. Unfortunately, symmetric illumination of DPM dataforms can make the image difficult to decode when the dataform is illuminated at certain angles.

In another dark field illumination implementation, glancing illumination is used to brightly illuminate the dataform. Glancing illumination is illumination that strikes the dataform at an extreme angle. Light that strikes the surface of the object glances off, while light that strikes the craters of the dataform is reflected back to the scanner. A known handheld DPM scanner that provides glancing illumination comprises a clear cylindrical pipe. A first open end of the pipe is attached to the head of the scanner and a second end of the pipe contains LEDs. The LEDs provide a broad illumination and are broken into four equal groups. All the LEDs may be used at once or one group at a time may be used. In an exemplary operation of the scanner, a user places the second end of the pipe directly over a dataform to provide glancing illumination. Unfortunately, in order to make sure the illumination is glancing the user must place the pipe directly on or very close to the surface of the object. In addition, the field of view of the camera does not extend far beyond the second end of the pipe. Thus, the glancing scanner is not effective when a target dataform is surrounded by an obstruction, or if the dataform is recessed in a sunken area of an object since the illumination is no longer glancing and the field of view of the scanner may not extend that far.

Additionally, known DPM scanners with built in illumination subsystems, such as the ones described above, are often large and/or fragile. Accordingly, a need exists for DPM scanners with sturdy illumination subsystems that do not have to be placed directly over a target dataform and can produce images that are easier to decode.

In some DPM scanning situations, it is advantageous to read a target dataform from an angled position. Unfortunately, the symmetric look of the front end of known scanners tend to guide a scanner operator to scan dataforms head-on. Additionally, sensor positions in known scanners do not assist and/or compensate for scanner operators who scan dataforms head-on. Thus, the operator may not always attempt to read a DPM dataform at an optimal angle.

Accordingly, there is a desire for scanner designs that can guide an operator to angle a scanner to an optimal position when reading dataforms. Additionally, there is a desire for a scanner that can capture images at different angles even when pointed at a dataform head-on, or at an angle.

SUMMARY OF THE INVENTION

The invention as described and claimed herein satisfies this and other needs, which will be apparent from the teachings herein. An embodiment of the invention includes methods and apparatus for asymmetrically illuminating DPM dataforms.

An exemplary embodiment of the invention comprises a method of asymmetrical illumination for data capture, where, for example, a DPM scanning device illuminates a dataform using an illumination medium on one side of an optical module of the scanning device. Simultaneous with the illumination the scanning device captures an electronic representation of the dataform and decodes the dataform.

In an alternate embodiment of the invention, the DPM scanning device comprises a plurality of light sources located around the optical module of the scanner. These light sources may or may not be symmetrical with respect to the optical module. The scanner illuminates the DPM dataform using each of, or subsets of, the light sources in turn and optionally stops when it successfully reads the dataform. The multiple light sources allow the scanner to illuminate dataforms asymmetrically and at different angles.

In some embodiments, the illumination medium rotates about an axis, and the scanner illuminates the dataform at different rotational angles. The scanner captures and attempts to decode an electronic representation of the dataform at each angle and optionally stops after a successful decode.

In an alternate embodiment, the illumination medium is located externally from the data capture module, and is directed at the dataform. The illumination can be a point light source and/or be directed asymmetrically at the dataform. An external illumination medium can be used, for example, in a manufacturing assembly line environment.

Another embodiment of the invention comprises a housing bounding an internal area. The housing comprises a head including a top, a bottom, a first side and a second side. The first side extends towards the front of the head further than the second side forming a slanted front end in a top view of the head. A window is positioned along the slanted front end to allow a scan module to view a target object. The housing also comprises a handle that extends from the head.

In an embodiment, a housing having a slanted front end also comprises an illumination module on one side of the scanner head and a scan module on the other side of the head that can be positioned to view a target dataform at an angle. In alternate embodiments, a mirror can be added to increase the viewing angle of the sensor.

Still other embodiments of the invention comprise a scanner with a swiveling head that gives a scanner operator additional angles to read a target object. In another embodiment, the slanted front end of the scanner can have a cover that makes the scanner appear symmetrical. The position of the scanner's sensor within the slanted front end of the scanner housing allows the scanner to capture dataforms at an angle, even when the scanner is pointed symmetrically with respect to the target dataform.

Other objects and features of the invention will become apparent from the following detailed description, considering in conjunction with the accompanying drawing figures.

It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

Figure 1:
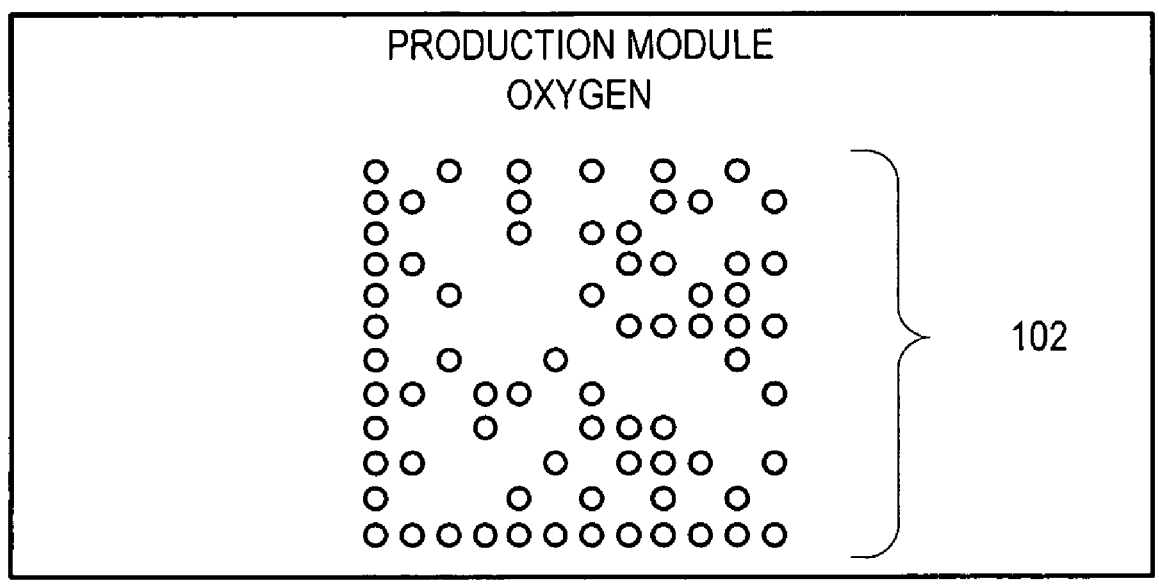
FIG. 1 illustrates an exemplary DPM dataform.

There will now be shown and described in connection with the attached drawing figures several exemplary embodiments of methods and apparatus for asymmetrical illumination. In addition, several exemplary embodiments of an asymmetrical scanner are also described.

An exemplary data capture device, such as, for example, a DPM image scanner, implemented in accordance with the invention comprises an illumination module, for example an LED, positioned on one side of a scan module, for example, the camera, of the scanner. The position of the LED relative to the camera creates asymmetrical narrow-beam illumination for scanning DPM surfaces.

In an additional embodiment of the invention, the angular tolerance of the scanner can be broadened by adding multiple lights or groups of lights around the camera. The placement of the lights may or may not be symmetrical with respect to the camera. During a decoding operation of an asymmetrical illumination scan method, each light or group of lights illuminates the dataform in turn. The scanner captures and decodes images of the dataform from each illumination angle, and can cease operation when a successful decode is made. In an alternate embodiment the angular tolerance can be increased using a rotating or pivoting illumination module.

When multiple illumination sources are used from multiple sides of a scanner's camera, it is hoped that the center of the crater is left in shadow, while the circumference of the crater is illuminated so that the crater appears as a single highlighted entity in an image. Unfortunately, when the illumination is not exactly a circle, multiple highlights and shadows created by the crater and the rim of the crater can create images that are difficult to decode. For example, when light is cast on an impact site from multiple angles, multiple highlights can be seen reflecting off of the curves surface of the crater. In addition, multiple shadows can be seen created by the rim of the crater. These additional highlights and shadows can complicate the interpretation of images.

When a dataform is scanned, the angle of the object with respect to the light source and the camera is dynamic since the object is either moving in front of the scanner or the scanner is being moved in front of the object. A DPM scanner typically takes multiple images during one decoding attempt since the angle of the object may be changing and the image captured at certain illumination angles may be easier to decode. When multiple symmetrical light sources are used to simultaneously illuminate a dataform, it can be difficult to frame the dataform to obtain one highlight and/or shadow per impact site, because there are numerous illumination angles where the multiple simultaneous light sources create multiple highlights and shadows in the captured image.

Even under asymmetrical illumination, at certain angles, the crater and rim of each impact site may create two sets of highlights and shadows, but the image is limited to those two sets. If illuminated symmetrically, the image can include additional highlights and shadows that make interpretation even more difficult. Thus, asymmetrically illuminating the DPM dataform increases the chances of capturing an image that shows one highlight and/or shadow per impact site, making the image easier to decode.

In some environments, such as, for example a manufacturing assembly line, data capture can be accomplished using a system comprising a data capture module and an external illumination medium. A DPM scanner's performance can be improved with the correct illumination, such as on-axis, off axis, asymmetrical, point or diffuse illumination, and the correct illumination can vary under different conditions and/or configurations. If a object's orientation is relatively constant with respect to the data capture module and the external illumination medium, such as, for example, objects on an assembly line, the external illumination medium best suited for the particular set of conditions can be chosen to be directed at the passing objects so that it correctly illuminates dataforms.

Figure 2:
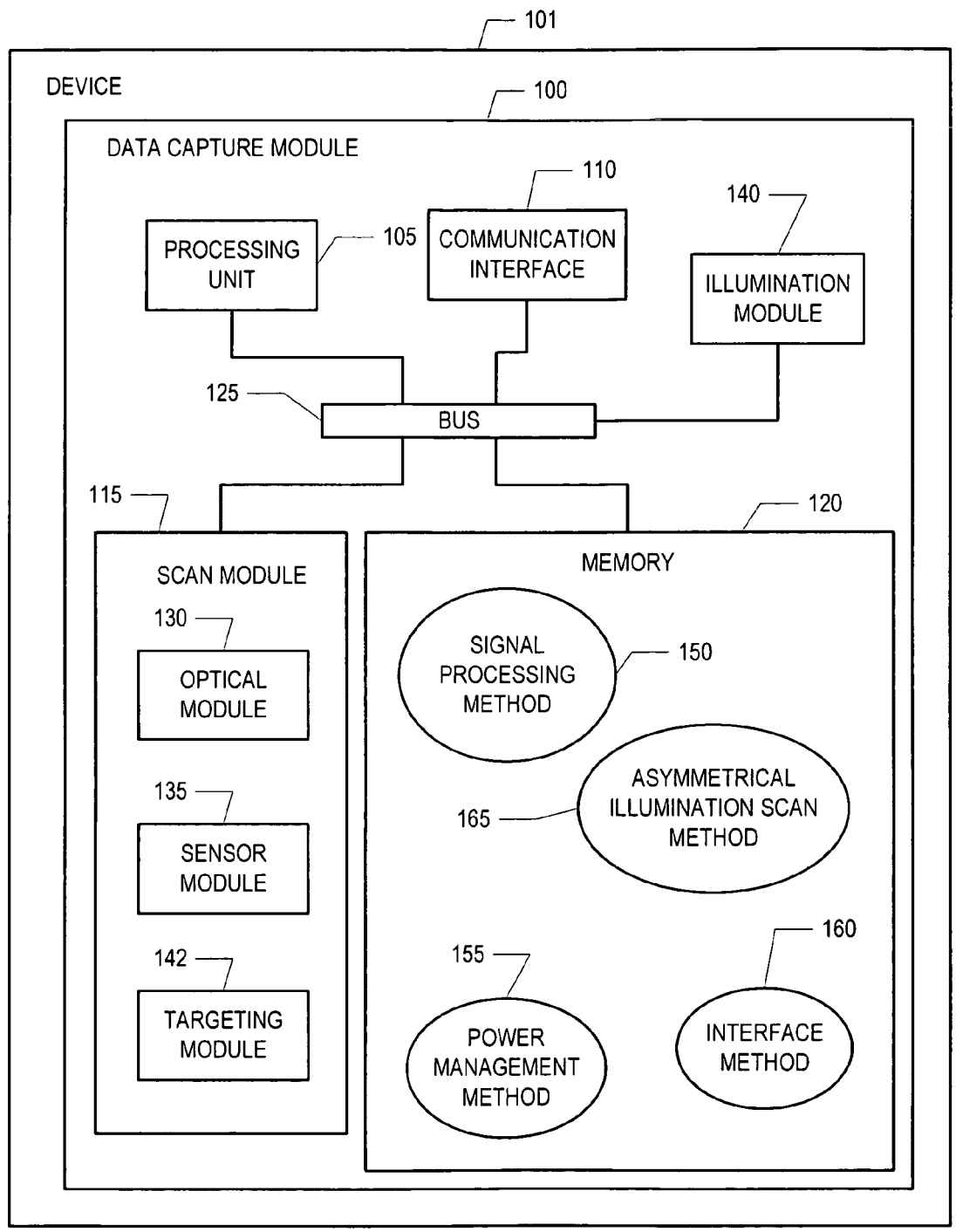
FIG. 2 illustrates an exemplary data capture module implemented according to an embodiment of the invention.

With reference to FIG. 2, there is shown an exemplary block diagram of a device 101 comprising a data capture module 100. The device 101 can be, in an exemplary embodiment, a hands-free scanner, a handheld scanner, a mobile computer, etc. The data collection module 100 can be, in one non-limiting exemplary embodiment, an image scanner module 100. The image scanner 100 can be integrated into the device 101. In addition, although the data capture module 100 is illustrated as being within device 101, in alternate embodiments, the data capture module 100 can be a separate module that is coupled to the device 101, by a wire or wirelessly. For example, in one embodiment, the data capture module 100 can be a convertible handheld/stationary scan gun coupled to a computer 101.

Image scanner 100 comprises processing unit 105, scan module 115, memory 120, communication interface 110 and illumination module 140 coupled together by bus 125. The modules of data capture module 100 can be implemented as any combination of software, hardware, hardware emulating software, and reprogrammable hardware. The bus 125 is an exemplary bus showing the interoperability of the different modules of the invention. As a matter of design choice there may be more than one bus and in some embodiments certain modules may be directly coupled instead of coupled to a bus 125.

Processing unit 105 can be implemented as, in exemplary embodiments, one or more Central Processing Units (CPU), Field-Programmable Gate Arrays (FPGA), etc. In an embodiment, the processing unit 105 can comprise a general purpose CPU that processes software and raw image data stored in memory 120. In other embodiments, modules of the processing unit 105 may be preprogrammed in the processing unit's 105 memory to perform functions, such as, for example, signal processing, interface emulation, etc. In alternate embodiments, one or more modules of processing unit 105 can be implemented as an FPGA that can be loaded with different processes, for example, from memory 120, and perform a plurality of functions. Processing unit 105 can comprise any combination of the processors described above.

Scan module 115 can be implemented as, in one exemplary embodiment, a camera 115 comprising an optical module 130, a sensor module 135 and a targeting module 142. The optical module 130 can be, for example, the lens 130 of the camera 115. In some embodiments, the optical module 130 can comprise of more than one lens and/or provide more than one focus point. In addition, the optical module 130 is not limited to lenses; any prism and/or other optical medium that is suitable for capturing images can be used to implement the optical module 130.

The sensor module 135 can be implemented, in one exemplary embodiment, as a Charged-Coupled Device (CCD). The CCD 135 records images in digital format for processing. In alternate embodiments, any sensor that captures images can be used to implement the sensor module 135, such as, for example, CMOS semiconductors. The illumination module 140, may be implemented, in one non-limiting exemplary embodiment, as one or more Light Emitting Diodes (LED) 145. Other illumination mediums may be used in alternate embodiments. The placement, number and use of the illumination medium 140 to provide asymmetric illumination are further described below.

Some embodiments of the invention may comprise a targeting module 142. The targeting module 142 comprises a light source or sources, for example, a laser, that projects a target approximating the field of view of the image scanner 100. The target appears on an object as a crosshair, a square, a circle, or any other design that can assist the user in placing the dataform in the field of view of the scanner.

Memory 120 can be implemented as volatile memory, non-volatile memory and rewriteable memory, such as, for example, Random Access Memory (RAM), Read Only Memory (ROM) and/or flash memory. The memory 120 stores methods and processes used to operate the image scanner 100, such as, signal processing method 150, power management method 155, interface method 160 and asymmetrical illumination scan method 165. The memory 120 can also be used to store raw image data and/or processed image data.

When a decoding operation is initiated, for example a trigger is depressed, the scanner 100 begins asymmetrical illumination scan method 165. In an embodiment of the invention, the scanner illuminates the target dataform from one side of the scan module 115. Scan module 115 capture images within the field of view of the scanner 100, and the images are analyzed and decoded by signal processing method 150.

Figure 3:
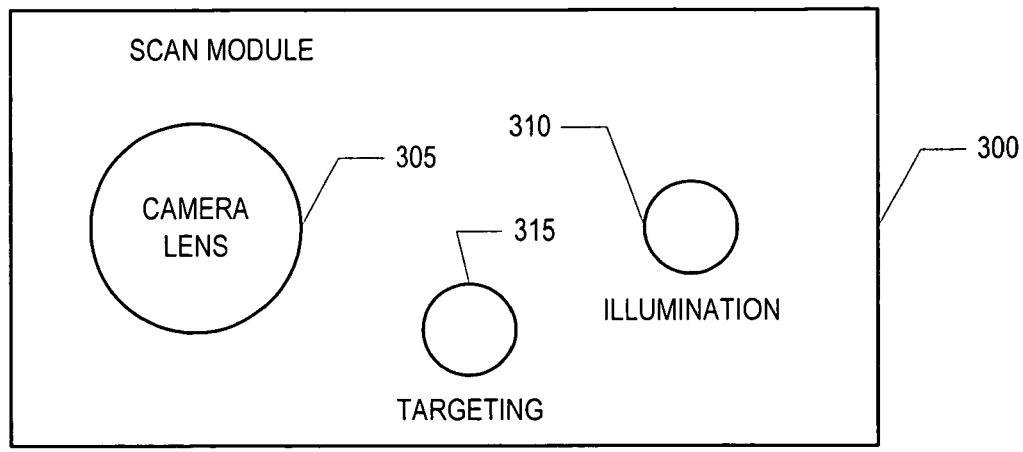
FIG. 3 illustrates an exemplary scan module implemented according to an embodiment of the invention.

FIG. 3 illustrates the front view of an exemplary scan module 300, implemented in accordance with an embodiment of the invention. Scan module 300 comprises a camera lens 305, an illumination medium 310 and a targeting lens 315. The illumination medium 310, for example LED 310, is located on the left side of the camera lens 305. Since the light from the LED 310 is coming from one side of the camera lens 305, LED 310 asymmetrically illuminates dataforms, during a decoding operation. In alternate embodiments, illumination module 310 may comprise a group of LEDs located on the same side of the camera lens 305. In an exemplary embodiment, the LED 310 is positioned to illuminate a target dataform at an angle when the lens 305 is lined up with the dataform. The light from the LED 310 illuminates the dataform at an angle, but the illumination medium and/or scanner does not have to be touching or extremely close to the dataform.

In another embodiment, in order to increase the angular tolerance of the scanner 100, the scan module 100 may comprise additional LEDs 140 located on different sides of the camera lens 130. Since the orientation of the object and the scanner are dynamic, the highlights and/or shadows created by the dataform may be easier to decode from one illumination angle over another. The dispersed LEDs, used in turn, allow the scanner 100 to asymmetrically illuminate the dataform from different angles. One or more images of the dataform are captured for each illumination angle, and once the dataform is successfully decoded the scanner 100 can optionally end the decoding operation.

Figure 4:
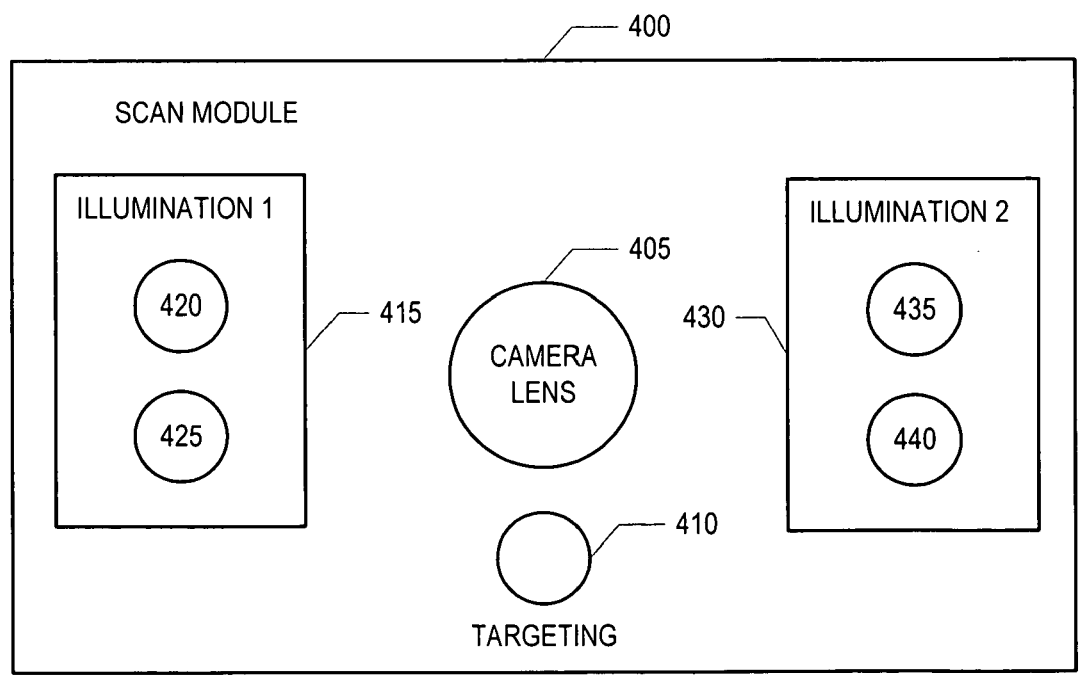
FIG. 4 illustrates another scan module implemented according to another embodiment of the invention.

FIG. 4 illustrates the front view of another exemplary scan module 400, implemented in accordance with the invention. Scan modules 300 and 400 are illustrative and are not drawn to scale. Scan module 400 comprises a camera lens 405, a targeting lens 410, a first illumination medium 415, which comprises a group of LEDs 420, 425 and a second illumination medium 430, which comprises a second group of LEDs 435, 440.

In an exemplary decoding operation of an asymmetrical illumination scan method, the scan module 400 captures and analyzes one or more images of a target dataform using the first illumination medium 415. If the scanner 100 does not successfully decode the dataform using the captured images, the scan module 400 illuminates the dataform using the second illumination medium 430, and captures and analyzes additional images. A decoding operation performed using the second illumination angle may be successful because the dataform and/or scanner 100 may be positioned so that the second illumination angle produces images that are easier to decode.

The exemplary embodiment illustrated in FIG. 4 is not limited to two illumination mediums. A plurality of LEDs or groups of LEDs can be placed around the camera lens. In addition, the illumination mediums do not have to be located symmetrically with respect to the camera lens 405. They can be located at different distances from the camera lens 405 to vary the illumination angles.

In some embodiments, the angular tolerance of the scanner 100 can be increased by using a rotating or pivoting illumination medium 140. The scanner 100 takes one or more images of the dataform at each illumination angle and optionally stops decoding when the dataform is successfully read.

Returning to FIG. 2, the data collection module 100 can be implemented as a module for different devices 101 that communicate in a variety of languages. Therefore, data collection module 100 comprises an interface method 160 that translates the decoded dataform into the language of the device 101 that interfaces with the data collection module 100. Different interfaces include Universal Serial Bus (USB), scanner emulation, IBM keyboard wedge, Symbol Serial Interface (SSI), etc.

Power management method 155 manages the power used by scanner 100. In some embodiments, the scanner 100 can switch to a power save mode, when no activity is detected for a given amount of time. The power save mode can completely shut down the scanner 100 or alternatively, it can slow the image capture rate, or initiate other power saving techniques.

The exemplary embodiment of FIG. 2 illustrates signal processing method 150, asymmetrical illumination scan method 165, interface method 160 and power management method 155 as separate components, but these methods are not limited to this configuration. Each method described herein in whole or in part can be separate components or can interoperate and share operations. Additionally, although the methods are depicted in the memory 120, in alternate embodiments the methods can be incorporated permanently or dynamically in the memory of processing unit 105. In some embodiments, scan module 115 can be separate from the data capture module 100, and the data capture module 100 can be implemented using a general purpose computer and software.

Memory 120 is illustrated as a single module in FIG. 2, but in some embodiments image scanner 100 can comprise more than one memory module. For example, the methods described above can be stored in separate memory modules.

Figure 5:
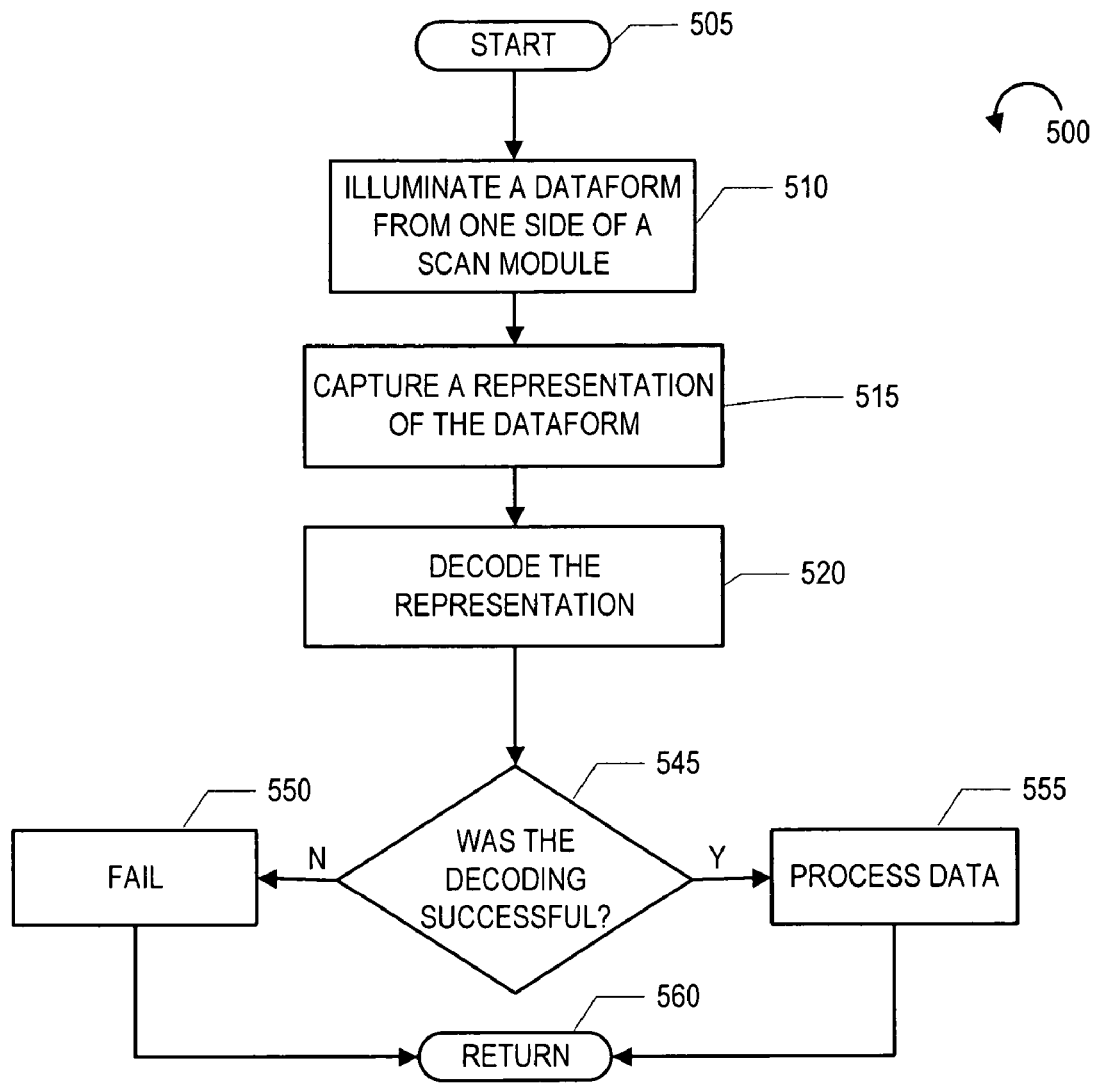
FIG. 5 illustrates an exemplary asymmetrical illumination method implemented according to an embodiment of the invention.

FIG. 5 illustrates an exemplary embodiment of a method 500 for scanning dataforms using asymmetrical illumination. Reference to image scanner 100 is made in the description of method 500. The steps of method 500 and other methods described herein are exemplary and the order of the steps may be rearranged as a matter of design choice. Asymmetrical illumination scan method 500 begins with start step 205. In an exemplary embodiment, the method 500 begins when the image scanner 100 and/or device 101 receives power and/or when a trigger or button on the scanner 100 is pressed. The device 101 and/or scanner 100 can run diagnostics prior to operation.

Processing proceeds from step 505 to step 510, where the scanner 100 illuminates a target dataform from on side of a scan module. The scan module 300 of FIG. 3 illustrates an exemplary configuration having an illumination medium 310 located on one side of the scan module 300. Illumination from one side of the scan module 300 asymmetrically illuminates the target dataform in accordance with the invention.

Processing proceeds from step 510 to step 515, where the scanner 100 captures a representation, for example a digital image, of the target dataform. Then, in step 520, the captured image is analyzed and the target dataform is decoded. In step 545, if the decoding algorithm is successful, processing proceeds to step 555, where the decoded data is further processed. For example, the data can be translated into a language that the device 101 can interpret. For example, if the image scanner 100 is attached to a computer via a USB connection, the decoded dataform is translated into a serial form, in step 555, and communicated to the device 101 through communication interface 110. Following step 555, processing of method 500 proceeds to step 560 where the method 500 returns to step 505, and the image scanner 100 is ready to process another dataform.

Returning to step 545, if the scanner 100 does not successfully decode the target dataform, processing proceeds to step 550. In some embodiments, the image scanner 100 does nothing, and returns in step 560 to step 505, but in other embodiments the scanner 100 can transmit a fail signal to the communication interface 110, and/or emit an audible fail indicator to the scanner 100 operator. The device 101 can be programmed to recognize the fail signal and alert the operator of the failure through an audible sound, and/or a message on a screen. Additionally, the scanner 100 and/or device 101 can instruct the operator to hold the dataform up to the scanner 100 and/or angle the scanner and/or object in different directions.

Returning to step 550, in alternate embodiments, in response to a failed decoding attempt, the scanner 100 returns, in step 560, to step 510 and takes another picture of the target dataform for analysis. The scanner 100 can try a predetermined number of times before failing. In other embodiments, two or more images may be analyzed in parallel.

Figure 6:
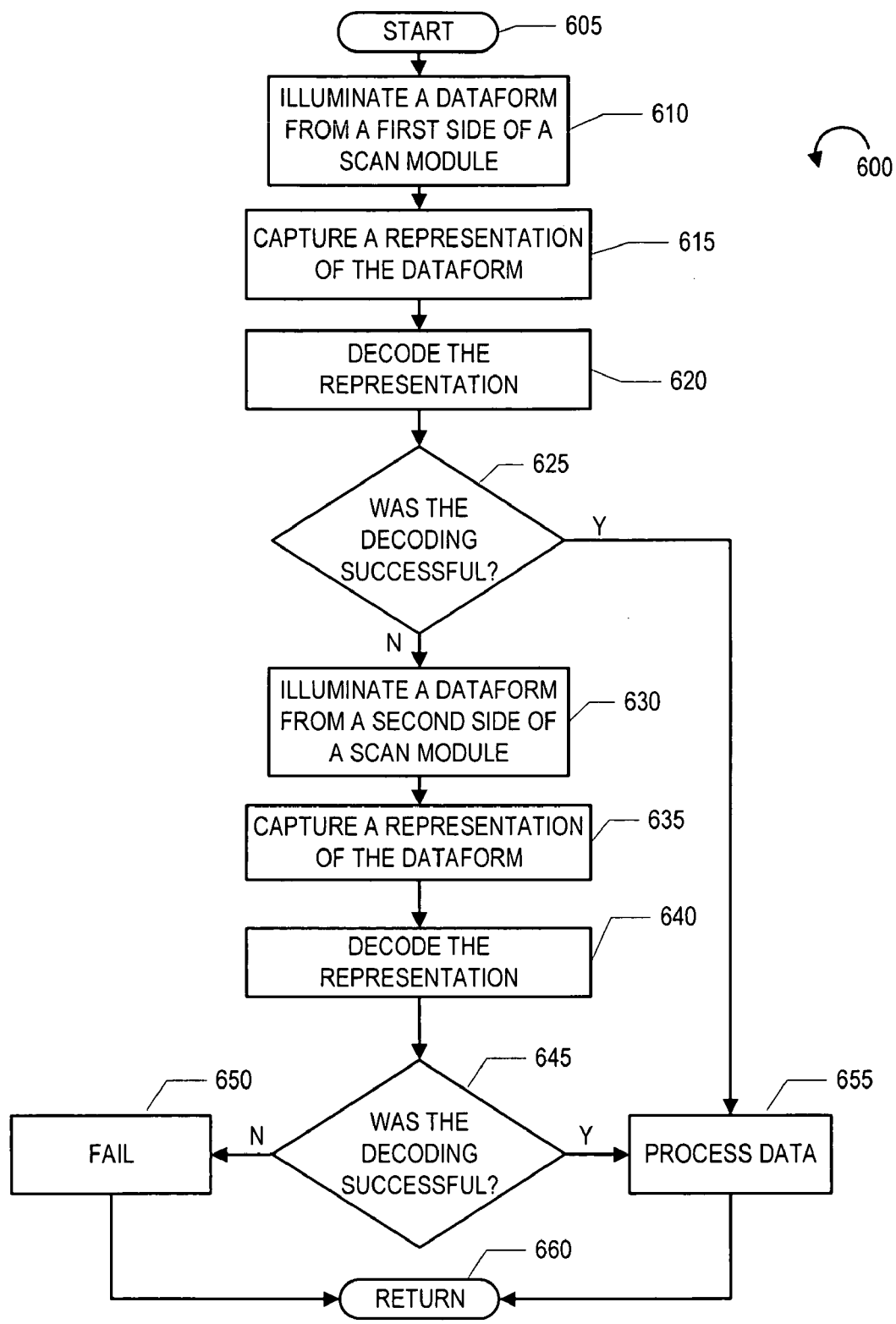
FIG. 6 illustrates an alternate symmetrical illumination method implemented according to an embodiment of the invention.

As illustrated in FIG. 4, the scanner 100 can comprise two or more illumination modules. FIG. 6 illustrate an exemplary embodiment of another asymmetrical illumination scan method 600, where the scanner 100 comprises a scan module with two illumination modules located to the left and right of a camera lens.

Asymmetrical illumination scan method 600 starts in step 605 where the scanner 100 is triggered into operation and/or receives power. In step 610, the scanner 100 illuminates the target dataform using a first illumination module, for example illumination module one 415. In alternate embodiments method 600 can start with illumination module two 430, or the scanner 100 can alternate between the illumination modules for every decoding operation.

Processing proceeds from step 610 to step 615, where the scanner captures a digital representation of the dataform, and in step 620 the image is decoded. If the decoding is successful, processing proceeds from step 625 to step 655, where the decoded data is further processed. Then, in step 660, the scanner 100 returns to start step 605, and is ready for another dataform.

Returning to step 625, if the decoding of the captured image is not successful, processing proceeds from step 625 to step 630, where the scanner 100 illuminates the target dataform from a second side, for example, illumination module two 430, of the scan module 400. In step 635, an image of the illuminated dataform is captured and in step 640 the image is decoded. In step 645, if the decoding is successful, processing proceeds from step 645 to step 655, where the decoded data is further processed. Then, in step 660, the scanner 100 returns to start step 605, and is ready for another dataform.

Returning to step 645, if the captured image is not successfully decoded, processing proceeds to fail step 650. Following step 650, in some embodiments method 600 returns, in step 660, to step 610 and attempts to decode the dataform again. This loop can be repeated for a predetermined number of iterations or until the scanner successfully decodes the dataform. In other embodiments, the scanner 100 returns, in step 660 to start step 605.

In other embodiments of method 600, the scanner 100 can capture images and attempt to decode the target dataform using the same illumination module for a predetermined number of times before switching to another illumination module.

A similar method as the one described in method 600 can be used in an embodiment where the scanner 100 increases angular tolerance using a rotating illumination module. Instead of capturing images using different illumination sources, multiple illumination angles are created by rotating the illumination medium.

Figure 7:
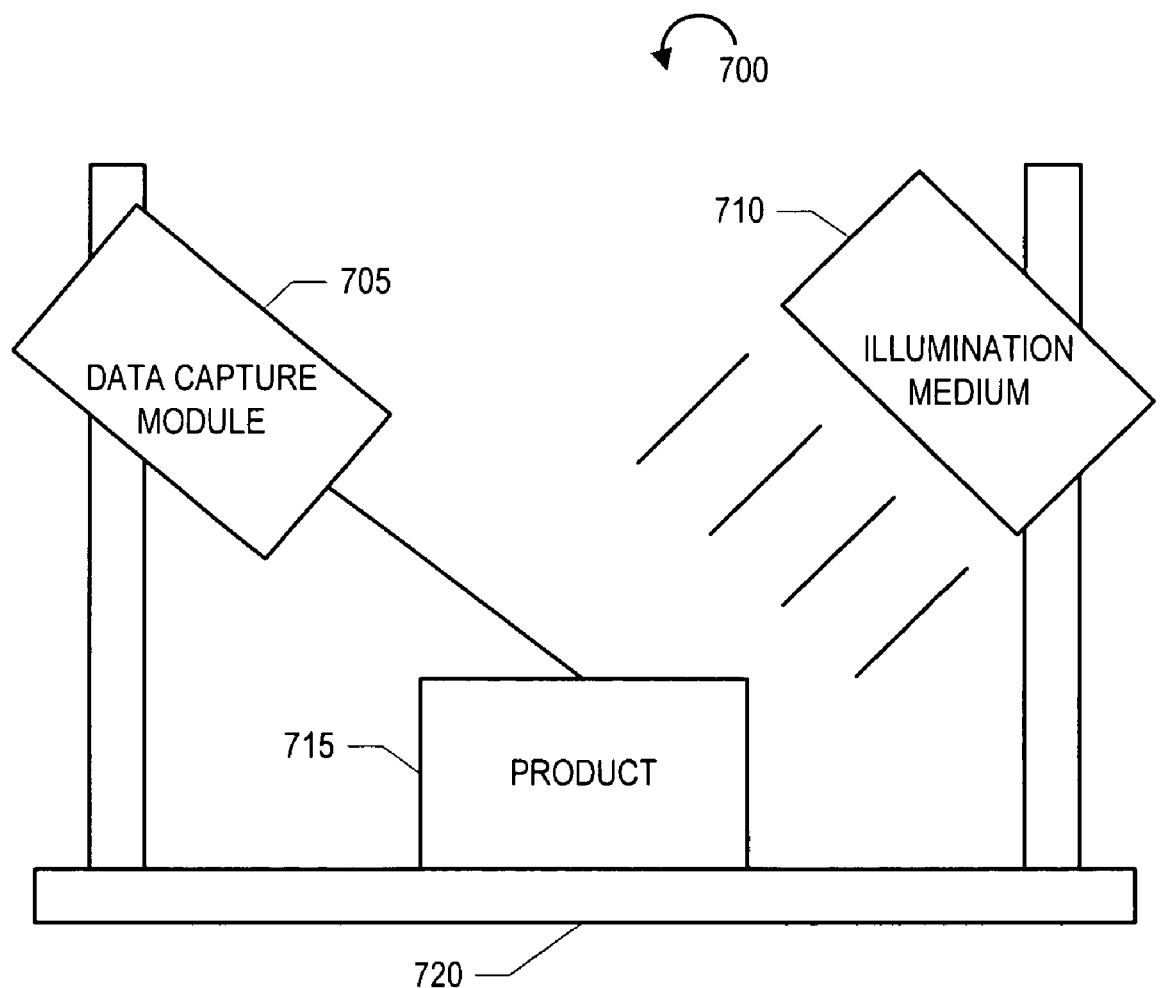
FIG. 7 illustrates an alternate embodiment of the invention comprising an external illumination medium.

FIG. 7 illustrates an alternate embodiment of the invention comprising a data capture system 700 with an external illumination medium. Data capture system 700 comprises a data capture module 705 and an illumination medium 710 directed at a object 715. The object 715 comprises a DPM dataform, for example, a two dimensional code. In one exemplary embodiment, the data capture system 700 is coupled to a structure 720 that is part of an assembly line. Objects are illuminated by illumination medium 710 as they pass the field of view of the data capture module 705. The data capture module 705 captures and analyzes the dataforms on the passing objects 715. In alternate embodiments, the data capture system 700 may comprise a structure 720 comprising a base or a platform, where objects can be placed for analysis.

In one embodiment, the data capture module 705 is implemented using a DPM scanner 705 without an illumination medium. Dataforms are illuminated by external illumination medium 710. The external illumination medium 710 can be implemented as a continuous mode fluorescent light-box, a flash illumination light box powered by LEDs, flash lamps, etc. The external illumination is chosen and positioned, manually and/or automatically to optimally illuminate DPM dataforms that pass the field of view of the scanner 705. For example, the illumination medium chosen can be point or diffuse illumination and the illumination medium 710 can be positioned asymmetrically, on-axis, off-axis, etc. Additionally, in alternate embodiments, the data capture system 700 can comprise multiple illumination mediums and perform the asymmetrical illumination scan method as described in FIG. 6.

In some embodiments, in order to facilitate synchronous illumination, the scanner 705 is coupled to the illumination medium 710, either by wire, wirelessly, through another computer, etc. The scanner 705 can transmit a control signal that turns on the external illumination medium 710 when the scanner 705 takes an image. The scanner's 705 exposure setting can be slightly longer than the illumination control signal, so that a delay in the illumination control signal does not cause the illumination medium 710 to be activated outside an exposure period. Turning the illumination medium on and off creates a flashing effect that freezes dataforms on moving objects.

Commonly available sensors, be it CCD or CMOS sensors, often are designed to operate optimally at 25-30 frames per second, according to the prevailing television signal standards around the world. Flash illuminations repeated at these rates tend to exhibit the effect of flicker. But for an environment like that of a constantly moving assembly line, repeated scanning at the maximum allowed rate is sometimes desirable. A method to suppress the flicker effect is to cause the illumination module to produce more flashes than that required by the number of image captures by the data capture module.

While asymmetrical illumination improves DPM scanner performance, further performance increases can be achieved by tilting a DPM scanner and reading a target dataform at an angle. Titling the scanner to achieve better performance may not be obvious to a DPM scanner operator, especially since the front end of known scanners are symmetrical. Thus, an exemplary embodiment of the invention comprises an asymmetrical housing having a slanted front end and a window positioned across the slanted front end. The asymmetrical scanner body serves at least two ergonomic purposes. In one exemplary embodiment of the invention, the optical components, including the scan module, the illumination module, and the window, are positioned in a tilted setup, with respect to the main part of the scanner body. Thus, if the scanner is used to scan a part straight on, the optical components are effectively tilted with regard to the part being scanned. Additionally, since the operator is not sure whether to scan a dataform head-on or with the window facing the dataform, the slanted front end tends to guide an operator to tilt the scanner. The operator might try to scan a dataform from a head-on position and if the operator is unsuccessful, the operator can try to scan the dataform with the window facing the dataform.

The operator may even start at a head-on position and rotate the scanner so that the window is facing the dataform or start with the scanner window facing the dataform and rotate the scanner so it is head-on. Since a scanner can continuously attempt to read the dataform while its trigger is pressed, an operator rotating the scanner, from one position to another, in front of a dataform can find an angle where the scanner decodes the dataform. The asymmetrical shape of the scanner helps new scanner operators learn helpful methods for scanning DPM dataforms.

Alternatively, or in addition to having an asymmetrical front end, a scanner implemented in accordance with an embodiment of the invention, may also have a tilted sensor position, so that even if the scanner is pointed at a dataform head on, the senor is at an angle to the dataform. Additionally, if an operator attempts to read a dataform at an angle, a tilted sensor position gives the scanner a greater scanning angle.

Figure 8:
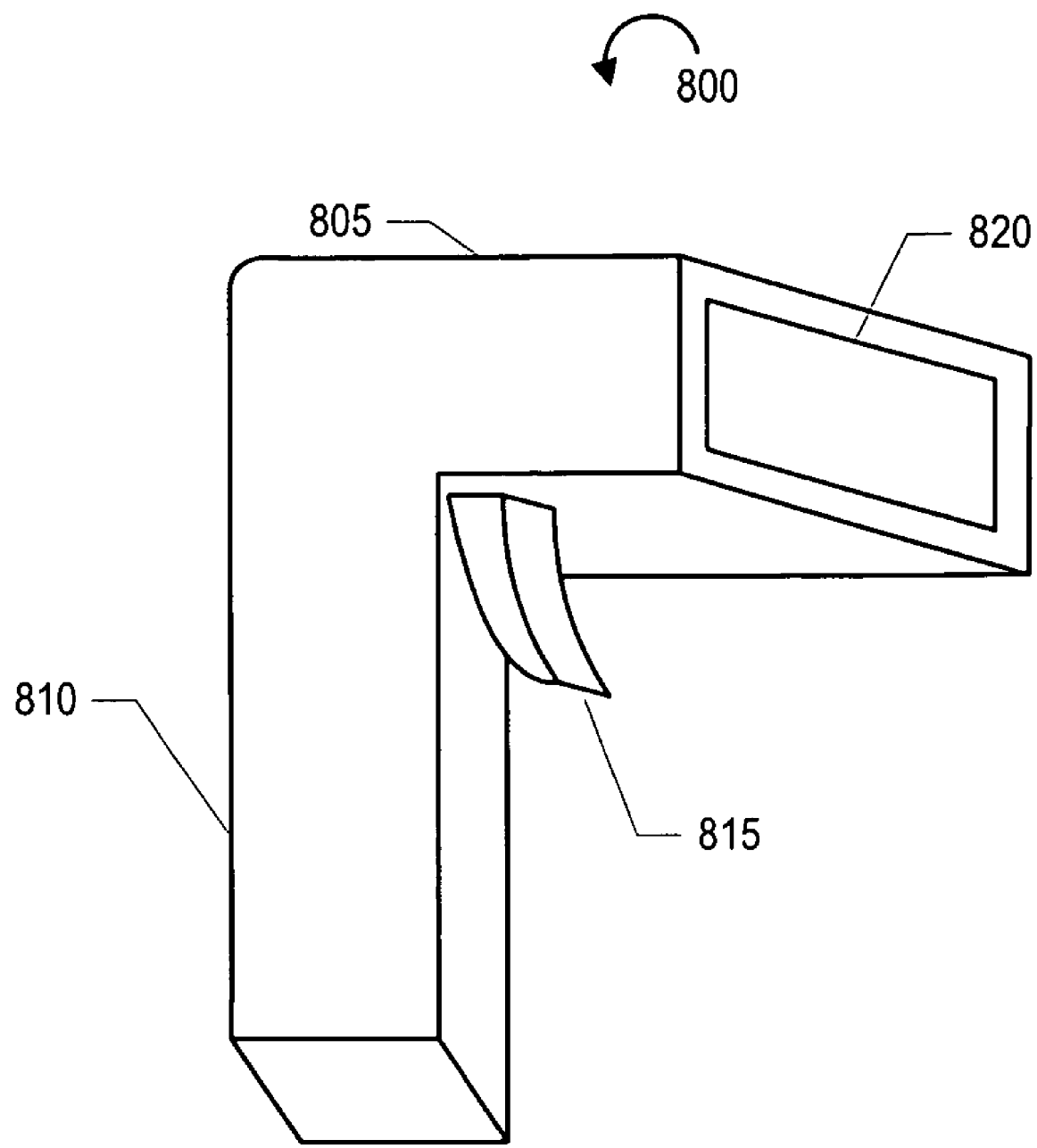
FIG. 8 illustrates an exemplary block diagram of an asymmetrical scanner implemented according to an embodiment of the invention.

FIG. 8 illustrates a block diagram of an exemplary asymmetrical scanner 800 implemented in accordance with the invention. Scanner 800 comprises a housing bounding an internal area. The housing comprises a head 805, a handle 810 and a trigger 815. The head has a slanted front end comprising a window 820 across the front end. The scanner 800, illustrated in FIG. 8, has a slanted front end where the left side of the scanner extends further than the right side of the scanner. In alternate embodiments, the front end can slant in the other direction so that the right side of the scanner extends further than the left side of the scanner. The general shape of the scanner 800, may be used in any of the scanner embodiments described below. Additionally, the asymmetrical housing can be used with internal scan engines or scan modules of known and future scanners and devices.

Figure 9:
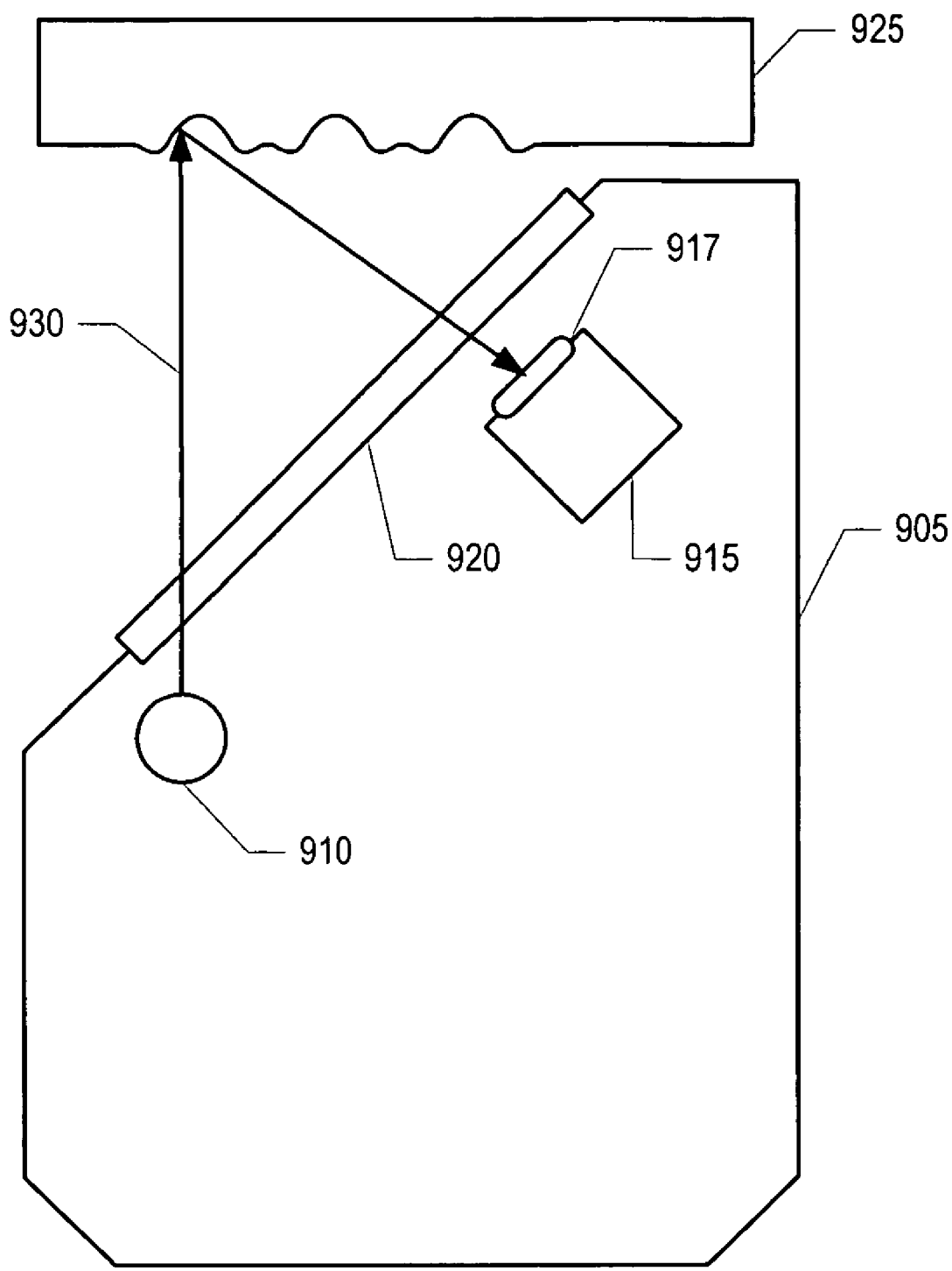
FIG. 9 illustrates an exemplary asymmetrical scanner implemented according to an embodiment of the invention.

FIG. 9 illustrates a top view of an exemplary scanner 900 implemented in accordance with the invention. The scanner 900 comprises a housing having an asymmetrical shape, a window 920, an illumination module 910 and a scan module 915. The scanner 900 also comprises a processing unit (not shown) and memory (not shown) comprising methods for performing scanner functions. The modules of the scanner 900 can be placed on one or more circuit boards and positioned in the scanner housing.

Figure 16:
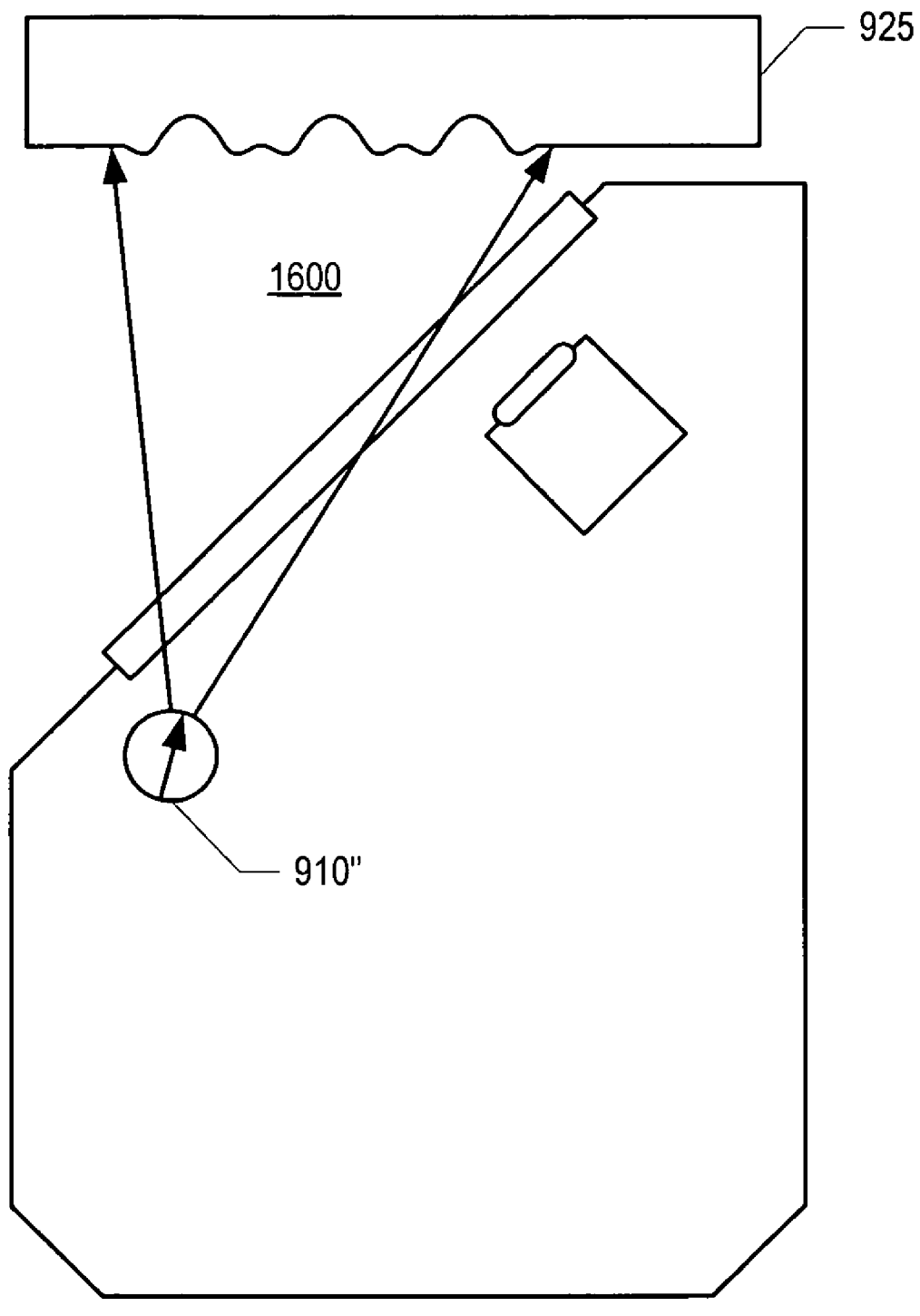
FIG. 16 illustrates an exemplary asymmetrical scanner comprising an illumination module tilted in an opposite direction as the scan module.

The illumination module 910 is positioned on the left side of the scanner head 905 and may be implemented as a single point source or a plurality of closely spaced light sources. The light sources can be, for example, a light emitting diode (LED), or any other light source. In one exemplary embodiment, the illumination module 910 is implemented using an LED with a 45° illumination spread. The arrow 930 extending from illumination module 910 represents light that can be emitted by the module 910. The illumination module 910 is not necessarily pointed in the direction of arrow 930. In different embodiments, the illumination module 910 can be facing the same direction as the scan module 915, it can be facing a head-on direction, it can be tilted towards the center of the scanner or at any other angle. FIG. 16 illustrates an exemplary scanner 900" comprising an illumination module 910" that is tiled towards the center of the scanner 900". The area 1600 illustrates the illumination spread of the module 910".

The scan module 915 is positioned on the right side of the scanner head 905 and comprises an optical module 917 and a sensor (not shown). The optical module 917 can be implemented as a lens 917 or a system of lenses and the sensor can be an imaging sensor, for example, a charge-coupled device (CCD). The optical module 917 can also comprise a lens holder having an aperture. Additionally, the scanner 900 can comprise a targeting module (not shown). The targeting module can be separate from the scan module 915 and can direct the scanner 900 operator to aim the scanner 900 head-on and/or at an angle, and/or the targeting module can display a pattern for the operator to follow, for example, an arrow. In the embodiment illustrated in FIG. 9, the scan module 915 is positioned so that an optical path between the optical module 917 and the sensor is essentially perpendicular to the slanted window 920. In alternate embodiments, the position of the scan module 915 can be rotated to the left or the right. For example the sensor can be positioned so that the optical path is parallel to the sides of the scanner head.

In FIG. 9, the scanner 900 is aimed at a target object 925 head-on, but the field of view of the scanner 900 is at an angle to the object 925. When the scanner 900 is activated, for example, the scanner's trigger is pressed, the illumination module 910 emits light 930, that is reflected by the DPM dataform on the target object 925. The position of the illumination module 910 and the scan module 915 makes it easier for the scanner 900 to capture light that reflects off the side wall of a DPM dimple, as shown in FIG. 9. A scanner operator can also try to decode a dataform by aiming the window of the scanner 900 toward an object 925, as illustrated in FIG. 15.

Figure 15:
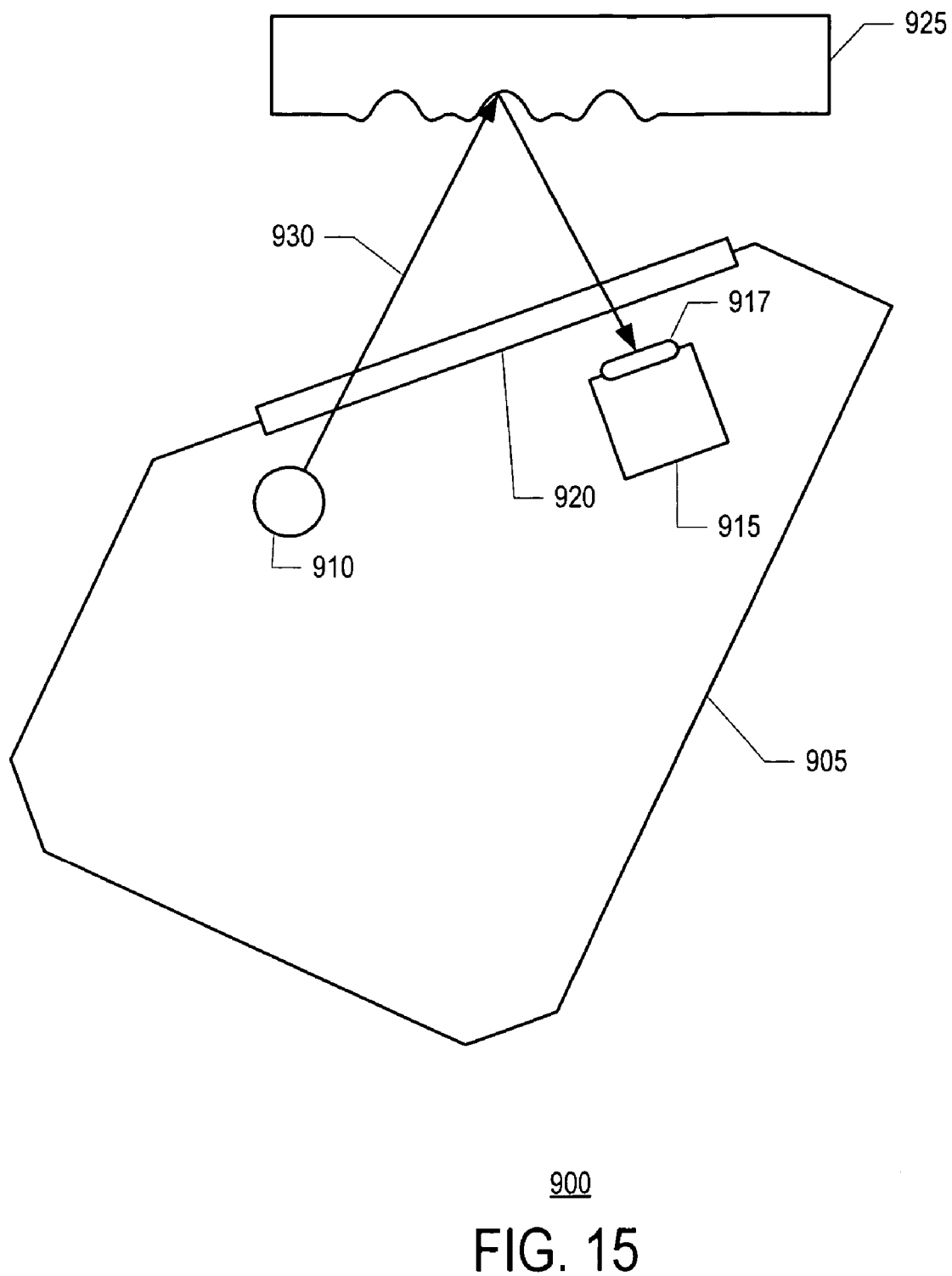
FIG. 15 illustrates scanning a dataform having the window of the exemplary scanner of FIG. 9, facing the dataform.

In an exemplary method of scanning dataforms, a scanner operator starts scanning an object 925 in the position illustrated in FIG. 9, and then rotates the scanner 900 to the position illustrated in FIG. 15. Rotating the scanner 900 allows the operator to find a scan angle that decodes the dataform.

Figure 10:
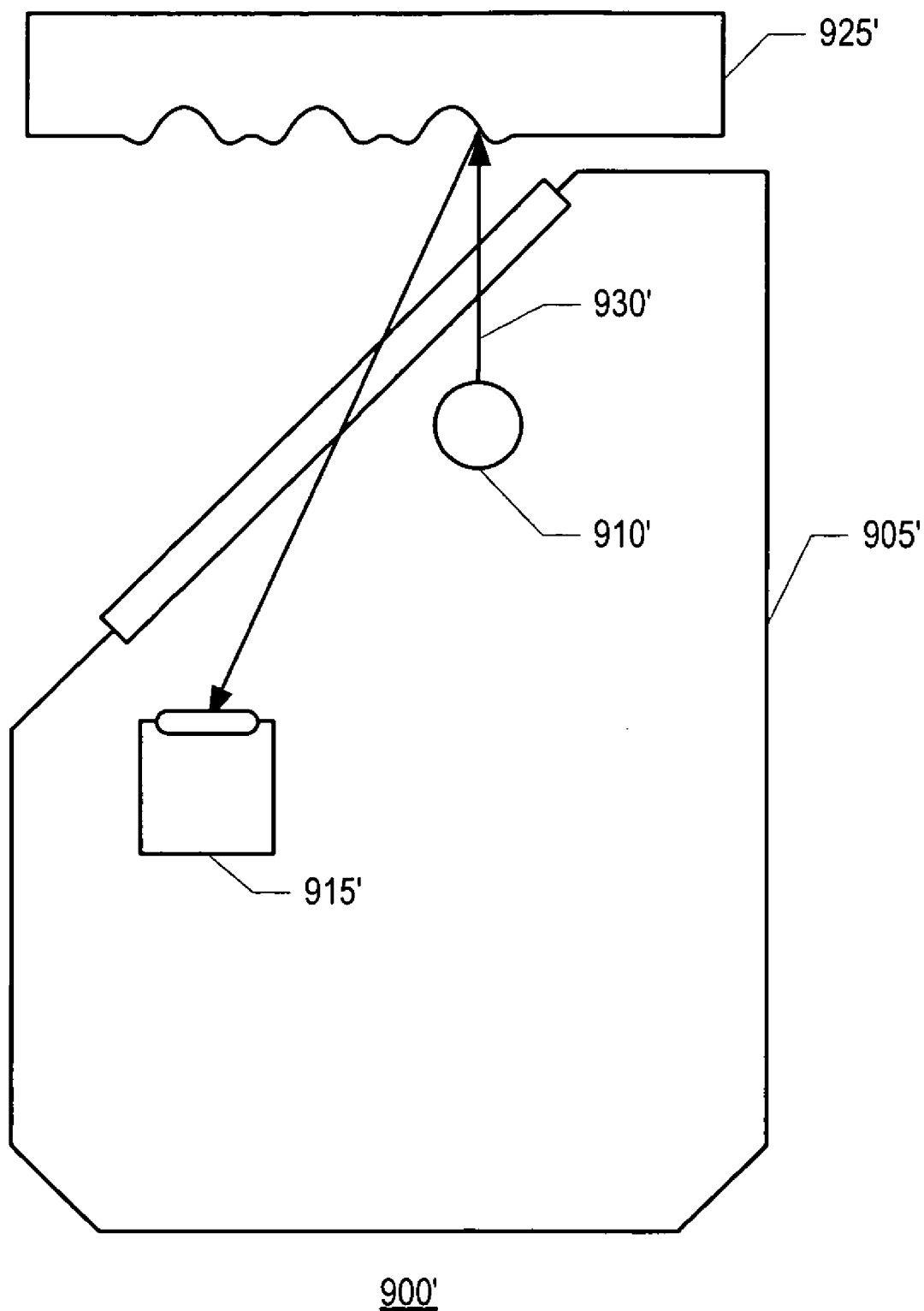
FIG. 10 illustrates an alternate asymmetrical scanner implemented according to an embodiment of the invention.

FIG. 10 illustrates an exemplary scanner 900' that is an alternative embodiment of the scanner 900, illustrated in FIG. 9. In this embodiment, the placement of the illumination module 910' and the scan module 915' have been switched. The illumination module 910' is on the right side of the scanner head 905' and the scan module 915' is on the left side of the scanner head 905'. The light 930' that is emitted by the illumination module 910', is reflected by the DPM dimples in the object 925', and is captured by the scan module 915' at an angle. An additional difference is the scan module 915' is positioned so that the optical path of the scan module 915' is essentially parallel to the sides of the housing head 905'. In alternate embodiments, the scan module 915' can be rotated to the left or to the right.

Each scanner 900, 900' has its own advantages. For example, when the scan module 915 is positioned closer to the front of the head 905, as illustrated in FIG. 9, there is more space between the scan module 915 and the part 925 to find a proper scan angle. When the scan module 915' is positioned further away from the front of the head 905', as illustrated in FIG. 10, the scan module 915' has a less distorted view of the part to be scanned. In alternate embodiments, the front of the scanners illustrated in FIGS. 9 and 10 can slant in the opposite direction so that the left side of the scanner head extends further out than the right side of the scanner head, as illustrated in the scanner 800 of FIG. 8. The illumination module and the scan module can be located on either side of such a scanner.

Figure 11:
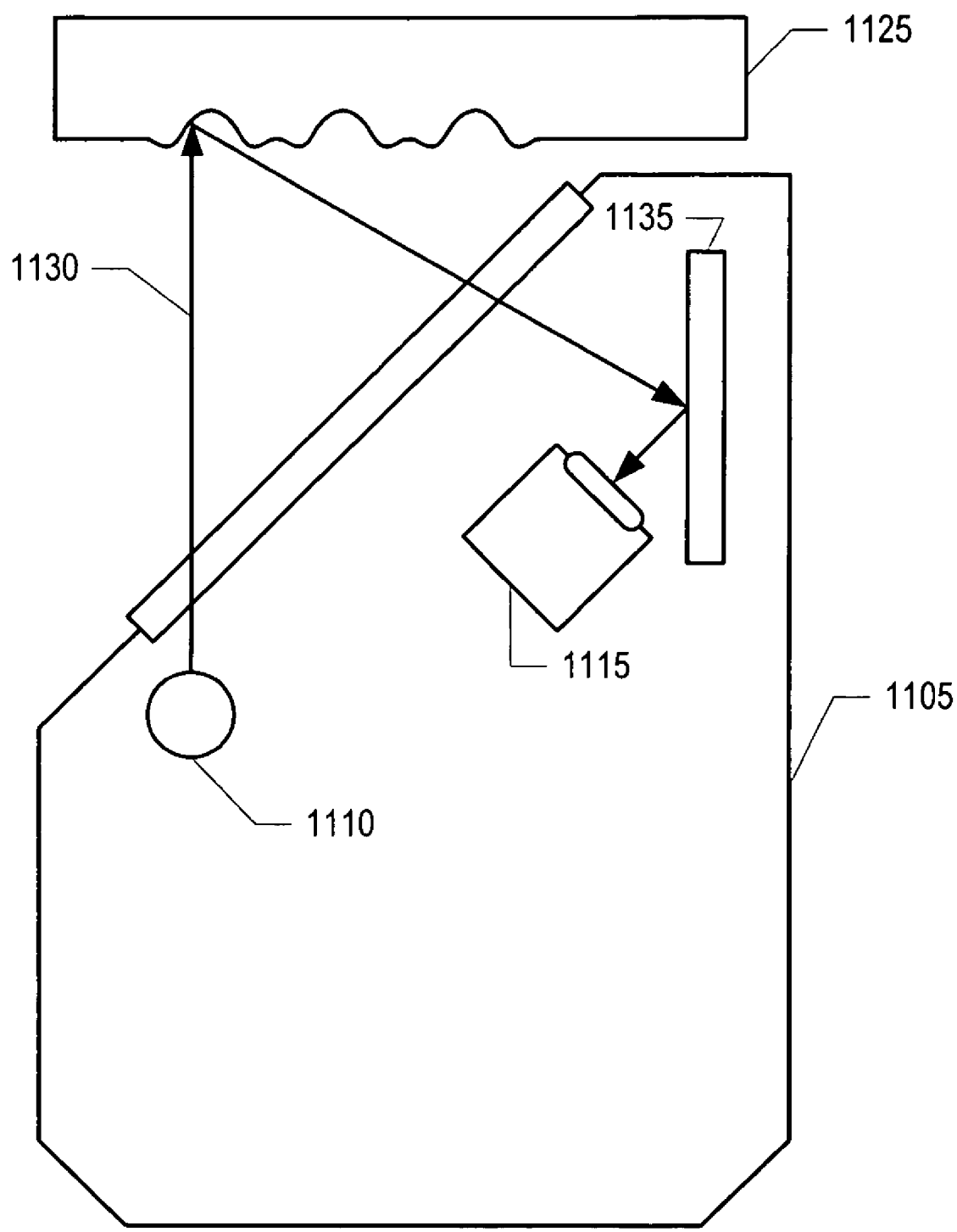
FIG. 11 illustrates an exemplary asymmetrical scanner comprising a mirror implemented according to an embodiment of the invention.

FIG. 11 illustrates an alternate embodiment of the invention where the scan module 1115 observes the part 1125 to be scanned through an optical element 1135, such as, for example, a mirror 1135. The optical element can also be a prism, a lens, etc. In the exemplary embodiment illustrated in FIG. 11, the illumination module 1110 is positioned further away from the front, on the left side of the scanner head 1105. The mirror 1135 is positioned closer to the front of the scanner on the right side of the scanner head 1105.

The mirror 1135 allows the angle between the illumination 1130 and the scan module 1115 to be even greater. In addition, the mirror 1135 allows the scan module 1115 to be positioned in alternate orientations. In an alternate embodiment, the optical element 1135 can be implemented as a prism that bends the field of view of the scan module 1115.

Figure 12:
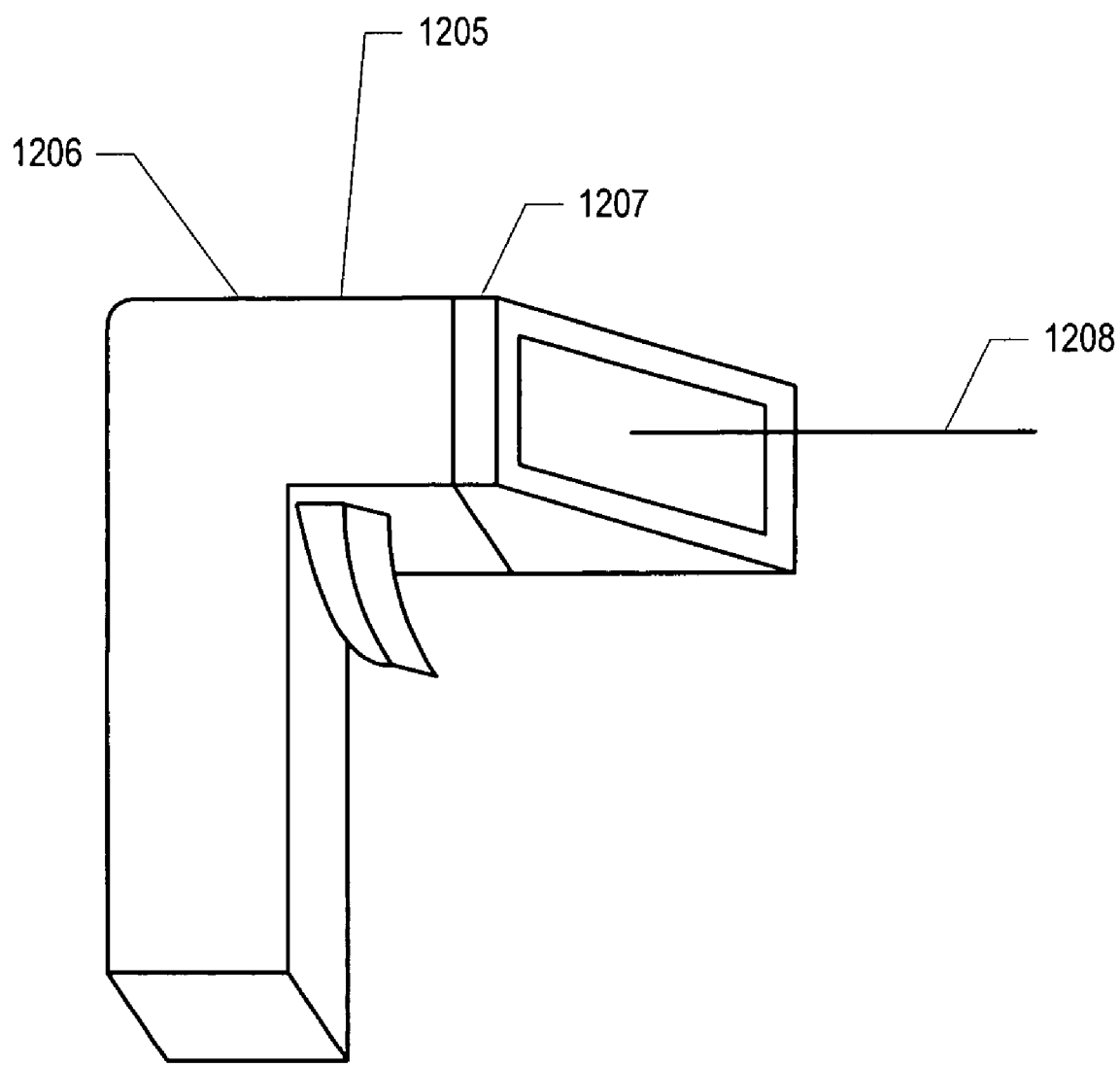
FIG. 12 illustrates an exemplary asymmetrical scanner, comprising a pivoting head, implemented according to an embodiment of the invention.

FIG. 12 illustrates an exemplary scanner 1200 implemented in accordance with the invention, in which the scanner housing comprises a pivoting or rotating head. The head 1205 of the scanner housing comprises a static portion 1206 and a rotating portion 1207. The axis of rotation 1208 of the head lies through the center of the head 1205 and the rotating portion 1207 can be moved such that the window can point to the left or the right. FIG. 12 illustrates the scanner 1200 in a first position where the left side of the scanner head 1205 extends towards the front further than the right side of the scanner head. The scanner 1200 can be configured into a second position where the right side of the scanner extends towards the front further than the left side of the scanner by pivoting the rotating portion 1207 180° around the axis 1208. This places the window of the scanner in the opposite direction as the direction shown in FIG. 12. The pivoting head allows left-handed operators to use the scanner more comfortably.

In an embodiment of the invention, some or all of the internal scanning elements, such as, for example, the illumination medium, the scan module and optionally a reflecting mirror, can be placed in the rotating portion 1207. In this embodiment, the internal scanning elements positioned inside the rotating portion 1207 rotate with the rotating portion 1207. The signal processing module of the scanner is sophisticated enough to decode dataforms with the rotating portion 1207 in either configuration.

Figure 13:
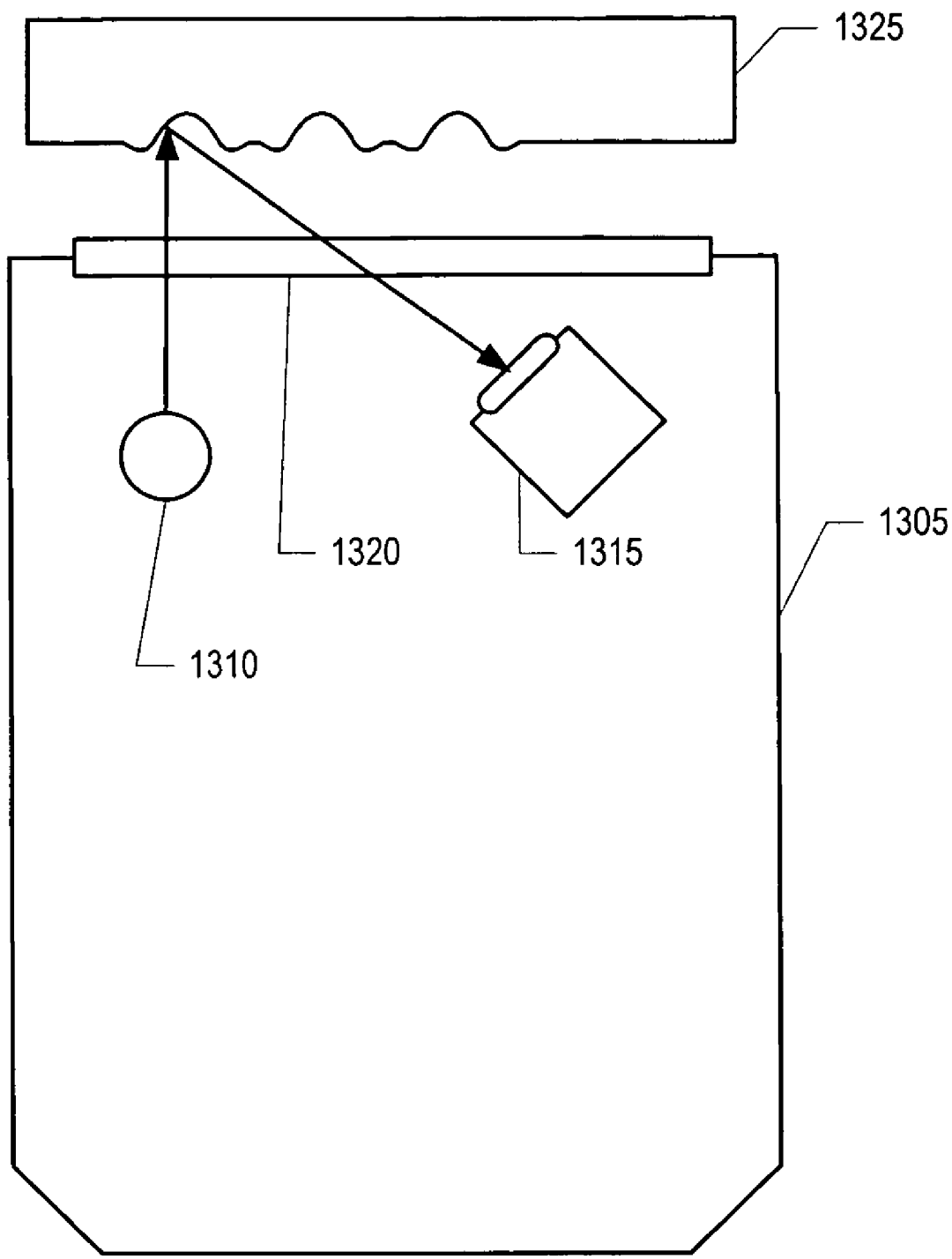
FIG. 13 illustrates a symmetrical scanner design, comprising a tilted sensor, implemented according to an embodiment of the invention.

FIG. 13 illustrates an exemplary scanner 1300, implemented in accordance with the invention, comprising a head 1305 with a symmetrical shape when viewed from the top. The scanner 1300 comprises an illumination module 1310, a scan module 1315 and a window 1320. The left and right sides of the head extend towards the front the same distance and a window 1320 is positioned across the front. The illumination module 1310 is positioned on the left side of the head 1305 and the scan module 1315 is positioned on the right side of the head 1305. The scan module 1315 is rotated towards the left at an angle so that it can see light reflecting off the dimples of the DPM dataform. The angle of rotation can vary between different embodiments of the invention.

In alternate embodiments of the exemplary symmetrical housing scanner 1300, the position of the scan module 1315 and the illumination module 1310 can be switched so that the illumination module 1310 is on the right side and the scan module 1315 is on the left side. The scan module 1315 can be rotated in the opposite direction. In another embodiment, the internal scanning elements can also comprise a mirror (not shown) and have a configuration similar to the scanner configuration illustrated in FIG. 11.

Figure 14:
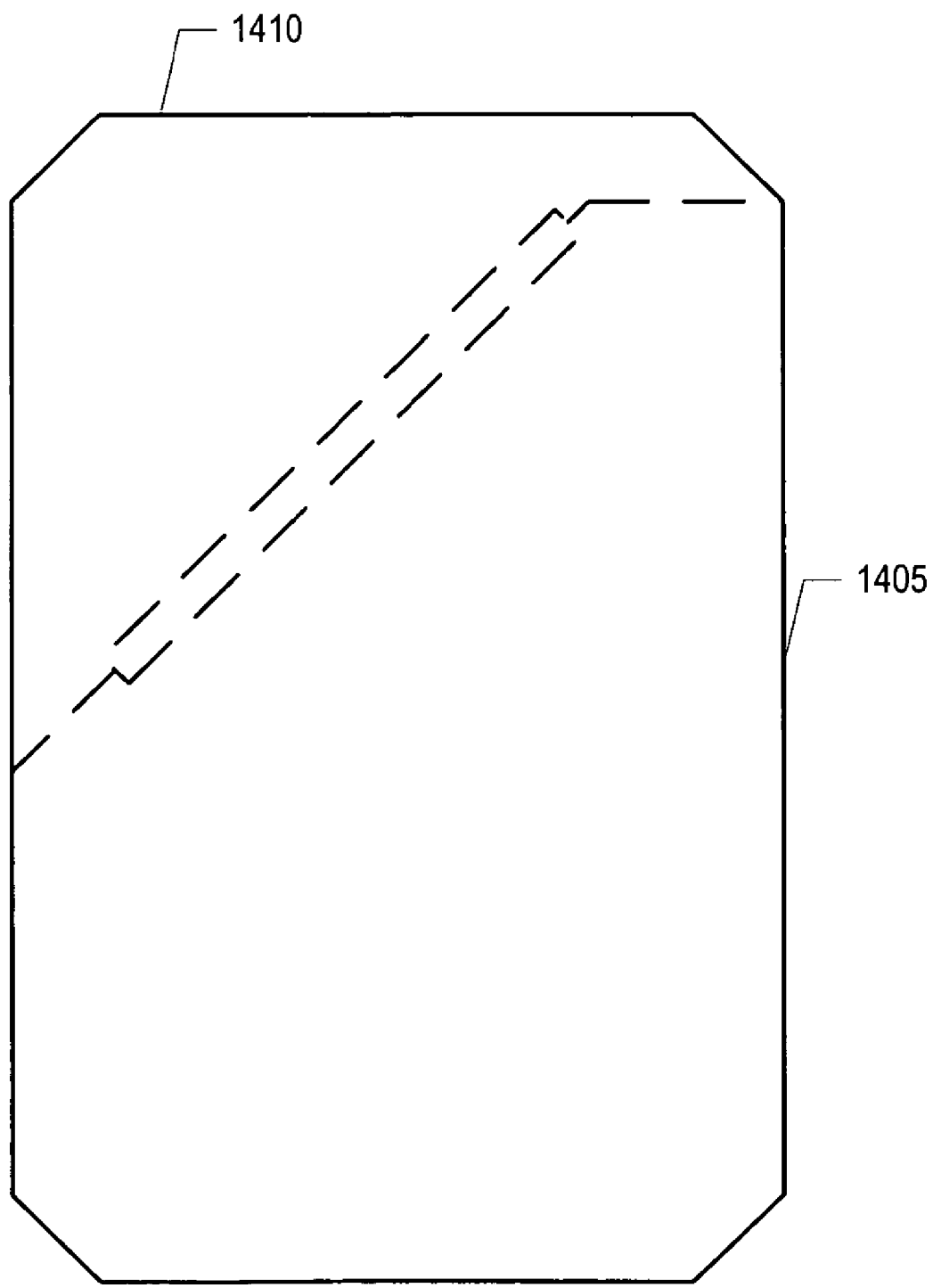
FIG. 14 illustrates an exemplary asymmetrical scanner, comprising an extending cover, implemented according to an embodiment of the invention.

FIG. 14 illustrates another embodiment of the invention where the scanner 1400, has a cover 1425 that extends from the slanted front of the scanner head 1405. The cover 1425 gives the scanner 1400 the appearance of being symmetrical. This embodiment gives the scanner 1400 a symmetric look, while still capturing target dataforms at an angle by using a slanted internal scan module configuration as described earlier in FIGS. 9-12. The cover 1425 can be a detachable cover.

While the embodiments of the invention were described for decoding dot-peened dataforms, the present invention can be used with dataforms created by other DPM techniques such as etching.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed is:

1. An imaging scanner comprising:
 a housing bounding an internal area, the housing including,
  a head comprising a top, a bottom, a first side and a second side, wherein said first side extends towards the front of the head further than said second side forming a slanted front end in a top view of said head,
  a window positioned along said slanted front end, and
  a handle extending away from the bottom of said head;
 a scan module comprising an optical module and a sensor module; and
 a processing unit.

2. The imaging scanner of claim 1, wherein said optical module comprises a lens and an aperture.

3. The imaging scanner of claim 1, wherein said scan module is positioned at an angle so that an optical path created between said optical module and said sensor module is essentially perpendicular to said window.

4. The imaging scanner of claim 1, wherein said scan module is positioned so that an optical path created between said optical module and said sensor module is essentially parallel to one of said first side of said scanner head and said second side of said scanner head.

5. The imaging scanner of claim 1, wherein said sensor module is one of a charged coupled device and a complimentary metal-oxide-semiconductor device.

6. The imaging scanner of claim 1, wherein said scan module is positioned inside and near one of the first side of said housing and the second side of said housing.

7. The imaging scanner of claim 1, wherein said scan module is facing said window.

8. The imaging scanner of claim 1, further comprising an optical element, said optical element bending incoming light towards said scan module.

9. The imaging scanner of claim 1, wherein said optical element is a mirror.

10. The imaging scanner of claim 1, further comprising an illumination module.

11. The imaging scanner of claim 10, wherein said illumination module is a point source illumination module.

12. The imaging scanner of claim 10, wherein said illumination module is positioned inside and near one of the second side of said housing and the first side of the housing.

13. The imaging scanner of claim 1, wherein said head comprises a rotating portion and a static portion, where the said scan module is contained within the rotating portion.

14. The imaging scanner of claim 1, further comprising a cover extending from said slanted front end forming a straight front end in a top view of said head.

15. An imaging scanner comprising:
a housing bounding an internal area, the housing including,
a head comprising a top, a bottom, a first side and a second side, a window positioned along a front end, and
a handle extending away from the bottom of said head;
a scan module comprising an optical module and a sensor module, wherein said scan module is positioned at an angle so that a field of view of said sensor is angled;
an illumination module; and
a processing unit.

16. The imaging scanner of claim 15, wherein said optical module comprises a lens and an aperture.

17. The imaging scanner of claim 15, wherein said scan module is positioned inside and near one of the first side of said housing and the second side of said housing.

18. The imaging scanner of claim 17, wherein said illumination module is positioned on the opposite side of said scan module.

19. A method of guiding a scanner operator comprising:
providing a scanner including a housing bounding an internal area, said housing comprising,
a head comprising a top, a bottom, a first side and a second side, wherein said first side extends towards the front of the head further than said second side forming a slanted front end in a top view of said head, a window positioned along said slanted front end, and
a handle extending away from the bottom of said head; and
rotating said scanner from a first position to a second position.

20. The method of claim 19, further comprising the step of providing a visual cue indicating a direction of rotation for said scanner.

* * * * *